United States Patent [19]
Harnish

[11] 3,820,554
[45] June 28, 1974

[54] FLUID PRESSURE RELIEF VALVE
[75] Inventor: Eugene E. Harnish, South Bend, Ind.
[73] Assignee: The Bendix Corporation, South Bend, Ind.
[22] Filed: Apr. 3, 1972
[21] Appl. No.: 240,740

[52] U.S. Cl............... 137/67, 137/377, 137/538, 137/543.15
[51] Int. Cl............................................ F16k 17/04
[58] Field of Search ............................ 137/67–72, 137/543.15; 220/89 A, 89 B

[56] References Cited
UNITED STATES PATENTS
| | | | |
|---|---|---|---|
| 2,141,847 | 12/1938 | Tennant | 137/70 |
| 2,620,090 | 12/1952 | Hill | 220/89 A |
| 2,932,308 | 4/1960 | Erb | 137/70 |
| 2,980,132 | 4/1961 | Prijatel | 137/469 |
| 3,016,015 | 1/1962 | Filstrup | 137/70 X |
| 3,425,444 | 2/1969 | Jones | 137/469 X |
| 3,693,691 | 9/1972 | Summers | 137/68 X |

Primary Examiner—Alan Cohan
Assistant Examiner—Richard Gerard
Attorney, Agent, or Firm—Gordon H. Chenez; William N. Antonis

[57] ABSTRACT

A fluid pressure release valve provided with a casing has an inlet and an outlet vented to high and low fluid pressure, respectively, wherein the inlet is sealed by a central portion of a spring loaded piston which spring bears against a stop member supported by a deformable support secured to the casing. The spring is overcome by a force derived from a predetermined high fluid pressure acting against the central portion exposed thereby venting high fluid pressure to the entire surface of the piston which moves into engagement with the stop member to load the same causing permanent deformation of the deformable support which, in turn, holds the piston away from sealing engagement with the inlet under bias of the spring to vent the inlet to the outlet and provides a visible indication of the released position of the valve.

9 Claims, 3 Drawing Figures

PATENTED JUN 28 1974 3,820,554

FLUID PRESSURE RELIEF VALVE

BACKGROUND OF THE INVENTION

The present invention relates to a fluid pressure relief valve particularly for use with aircraft pneumatic tires for preventing over-pressurization thereof as a result of air filling, tire friction and/or other environmental conditions.

It is a common practice to install a pressure relief or release valve on an aircraft wheel particularly in the case of large, heavy aircraft utilizing high inflation pressure in the tire to protect against tire overpressurization and resulting tire explosion which, in turn, can result in severe damage to structure and/or personnel in the proximity thereof.

Conventional pressure relief valves for aircraft tires of which I am aware take various forms and although satisfactory in operation are not entirely satifactory for other reasons. For example, one known pressure relief valve in use at the present time includes a vent passage connecting the tire interior with the atmosphere and sealed by a thin metal diaphragm which ruptures in response to a predetermined maximum allowable tire air pressure imposed thereon to vent the tire interior to atmospheric pressure. The undesirable characteristics of this known relief valve include premature failure of the diaphragm due to random fatigue thereof, relatively high cost and necessity for replacement of the entire valve upon diaphragm rupture.

SUMMARY OF THE INVENTION

The present invention provides a compact, light weight and reliable fluid pressure relief valve removably secured to an aircraft wheel and provided with a normally sealed vent passage connecting the interior of a pressurized tire with atmospheric air. The vent passage is sealed by an air pressure responsive member mounted on a deformable support and responsive to a predetermined maximum allowable tire air pressure thereby loading the deformable support causing permanent deformation thereof and resulting movement of the air pressure responsive member to permit unrestricted air flow through the vent passage to atmosphere.

It is an object of the present invention to provide a fluid pressure relief valve having a normally closed position and being actuated to a permanent open position in response to a predetermined maximum allowable fluid pressure.

It is another object of the present invention to provide a normally closed fluid pressure relief valve including a deformable member which is permanently deformed in response to a predetermined maximum allowable fluid pressure to thereby open said relief valve and which may be easily and quickly replaced to renew said relief valve.

It is an important object of the present invention to provide a compact and reliable fluid pressure relief valve particularly adapted for use with an aircraft tire.

Other objects and advantages of the present invention will be apparent from the following description taken with the accompanying drawings.

DESCRIPTION OF THE PREFERRED EMBODIMENT

Figure 1:
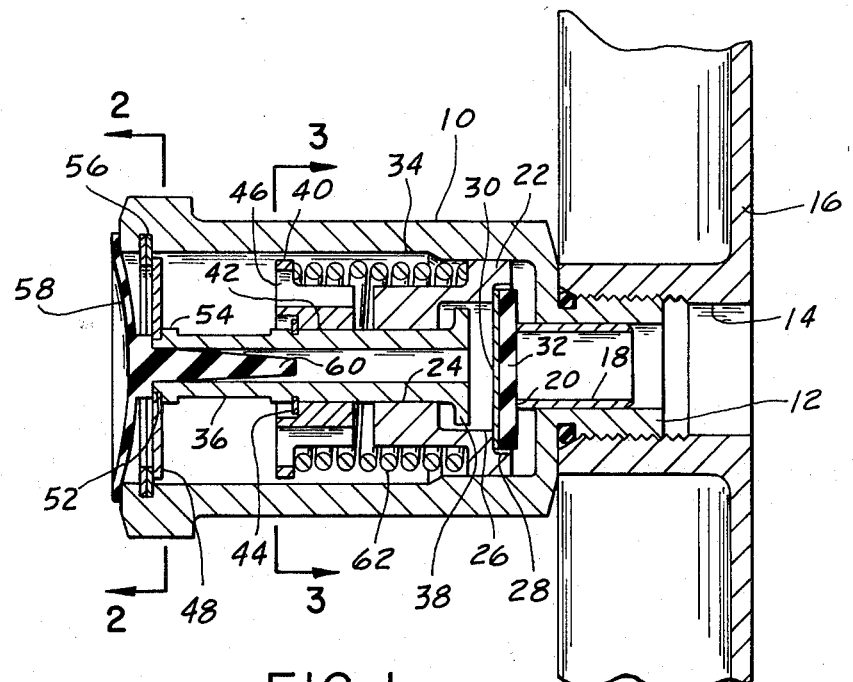
FIG. 1 is a schematic representation in section of a portion of the tire supporting section of an aircraft wheel and a fluid pressure relief device embodying the present invention secured thereto.
Figure 2:
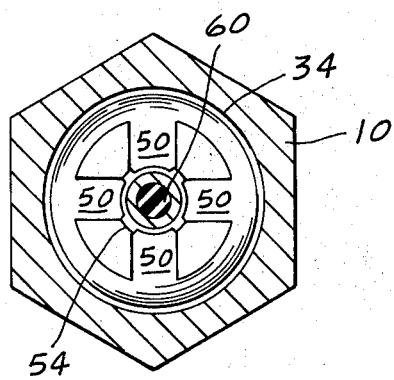
FIG. 2 is a section view taken on line 2—2 of FIG. 1.
Figure 3:
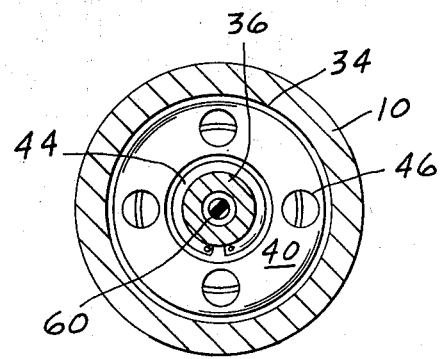
FIG. 3 is a section view taken on line 3—3 of FIG. 1.

Referring to the drawings and in particular FIG. 1, numeral 10 designates a tubular casing having a threaded air inlet portion 12 threadedly engaged with a vent port 14 in an aircraft wheel 16 and communicating with the interior of a tire, not shown, carried by the wheel 16. An O-ring 17 suitably interposed between casing 10 and wheel 16 provides a fluid seal therebetween. A sleeve 18 fixedly secured in inlet 12 as by a force fit extends into the interior of casing 10 to provide an annular valve seat 20. A piston 22 is provided with a central bore 24 and a stepped cavity 26 concentric therewith. The larger diameter portion of stepped cavity 26 defines an annular recess 28 adapted to receive and retain a circular plate or backing member 30 having a correspondingly shaped section of resilient sheet material or fluid seal 32 fixedly secured thereto by any suitable means such as a cement or the like.

The piston 22 is slidably contained by casing 10 which is provided with a stepped diameter cylinder 34. A tubular support member 36 extends through bore 24 into cavity 26 where the end portion of member 36 is flared radially outwardly to provide a stop 38 engageable with piston 22 as will be described.

An annular spring retainer 40 provided with a bore 42 through which tubular member 36 extends bears against a stop such as C-clip 44 which is received by a suitable recess in tubular member 36. A plurality of circumferentially spaced apart axially extending passages 46 are provided in spring retainer 40.

A washer-like support 48 having a plurality of radially inwardly extending flexible fingers 50 which terminate at a central opening 52 through which the tubular member 36 extends. An annular shoulder 54 formed on tubular member 36 bears against the radial inward ends of fingers 50 which tend to resist axial movement of tubular member 36 as will be described. The washer-like support 48 bears against a stop member 56 which may take the form of a C-clip removably secured in a suitable recess formed in casing 10.

The interior of casing 10 is sealed by a suitable removable dust or dirt cap 58 having a resilient stem portion 60 which extends into and is frictionally engaged with tubular member 36.

A compression spring 62 interposed between spring retainer 40 and a shoulder 64 formed on piston 22 by virtue of a reduced diameter section of piston 22 urges spring retainer 40 and piston 22 apart forcing the resilient seal 32 into engagement with valve seat 20 thereby sealing the same. It will be understood that the opposing reaction force imposed against spring retainer 40 is resisted by the flexible fingers 50 which require a predetermined force load in excess of the spring rate of compression spring 62 to cause flexing thereof as will be described. As shown in FIG. 1, the piston 22 and spring retainer 40 have a predetermined spaced apart relationship under the influence of spring 40.

It will be assumed that the tire pressure to which inlet 12 is exposed is less than the maximum allowable pressure for which the pressure relief valve is calibrated to open in which case the various component elements thereof will occupy the positions shown in FIG. 1.

Now, assuming an increase in tire pressure in excess of the maximum allowable tire pressure for any of the heretofore mentioned reasons, the resulting force derived from the tire pressure acting on the effective area of seal 32 overcomes the opposing force of spring 62 causing piston 22 to move into engagement with retainer 40 thereby venting inlet 12 to the relatively large annular area of piston 22 surrounding seat 20. The resulting increased force imposed by piston 22 against retainer 40 and thus tubular member 36 is imposed on fingers 50 which bend or flex permitting annular shoulder 54 to pass through opening 52 defined thereby whereupon tubular member 36 is free to slide axially through opening 52 under the influence of the pressurized piston 22. The pressurized piston 22 moves out of the smaller diameter section into the larger diameter section of cylinder 34 thereby establishing an annular opening through which the high pressure air from inlet 12 is vented to the opposite side of piston 22 from which it passes through passages 46 as well as the annular opening defined by the clearance between retainer 40 and cylinder 34 to relatively low pressure atmospheric air. The effective vent area defined by the clearance between piston 22 and cylinder 34 is relatively large compared to the area of the inlet 12 thereby providing substantially unrestricted flow from inlet 12 to atmospheric air. With the piston 22 in the above described position, it will be recognized that the air pressure must necessarily decrease even in the event that the tire is being inflated from an unlimited high pressure air supply assuming that the tire inflation air valve inlet, not shown, has an effective flow area less than that of inlet 12.

It will be noted that once the shoulder 54 is forced past fingers 50, the compression spring 62 will tend to force the retainer 40 and piston 22 apart causing stop 38, integral with tubular 36 to engage piston 22 which prevents further axial separation of retainer 40 and piston 22. The fingers 50 are preferably designed to exhibit permanent deformation or hysteresis once traversed by shoulder 54. After venting, the seal 32 will be prevented from reseating on seat 20 under bias of the spring, with the retainer 40 and piston 22 having some freedom of movement in the cylinder 34. Furthermore, the released condition of the relief valve is outwardly visible for inspection purposes during routine maintenance. Obviously, the relief valve is not reusable after it has performed its release function and must be removed for repair. However, the relief valve may be quickly and easily repaired for further use by removing and replacing the deformed fingered washer 48 only.

Other means may be substituted for the fingered washer 48. For example, the function performed by the fingers 50 may be performed by a deformable sleeve traversed by a ball attached to tubular member 36, a shearable member engaged by tubular member 36 or a crushable column engaged by tubular member 36 provided the reaction point thereof operates over a relatively short distance and then allows the piston freedom of movement axially.

I claim:

1. Fluid pressure relief valve apparatus comprising:
    a casing having an inlet vented to a first source of pressurized fluid to be controlled and an outlet vented to a second source of pressurized fluid at a relatively lower pressure;
    fluid pressure responsive means operatively engaged with said inlet for blocking same and having a first effective area thereof exposed to said first source of pressurized fluid;
    a fluid chamber partially defined by said fluid pressure responsive means;
    said fluid pressure responsive means having a second effective area thereof exposed to said fluid chamber and responsive to pressurization thereof;
    deformable support means operatively connected to said casing and provided with a stop adapted to be engaged by said pressure responsive means;
    resilient means operatively connected to said support means and said pressure responsive means for imposing a predetermined force preload on said pressure responsive means;
    said resilient means being overcome by said pressure responsive means in response to a predetermined maximum allowable pressure of said first source acting against said first area to thereby vent said inlet to said fluid chamber;
    said pressure responsive means being further responsive to said pressurized fluid in said fluid chamber acting against said second area and urged against said stop to load said support means causing permanent deformation thereof and subsequent movement of said pressure responsive means to vent said fluid chamber to said outlet;
    a second stop member on said support means having a fixed spaced apart relationship with said first named stop and adapted to be engaged by said pressure responsive means under the influence of said resilient means following deformation of said support means to prevent sealing engagement of said fluid pressure responsive means with said valve seat under bias of said resilient means.

2. Fluid pressure relief valve apparatus, as claimed in claim 1, wherein:
    said fluid pressure responsive means is a piston slidably contained by a stepped cylinder having an enlarged diameter portion adapted to receive said piston to thereby provide fluid communication between said fluid chamber and said outlet, said piston having a central bore.

3. Fluid pressure relief valve apparatus, as claimed in claim 2, wherein:
    said support means includes an annular member having a plurality of radially inwardly extending flexible portions and further includes an elongated member extending through said bore and having one end thereof bearing against the radial inward ends of said flexible portions;
    said elongated member being urged by said pressure responsive means against said flexible portions to cause deformation thereof and subsequent substantially unrestricted movement of said elongated member through said annular member.

4. Fluid pressure relief valve apparatus, as claimed in claim 3, wherein:
    said elongated member is tubular and provided with an annular shoulder portion engageable with said radial inward ends of said flexible portions.

5. Fluid pressure relief valve apparatus, as claimed in claim 4, wherein:

said cylinder has an open end defining said outlet; and cap means having a stem portion adapted to be received by said tubular elongated member for closing said open end.

6. Fluid pressure relief valve apparatus, as claimed in claim 1, wherein:

said first named stop includes a spring retaining portion; and said resilient means is a compression spring interposed between said spring retaining portion and said pressure responsive means.

7. Fluid pressure relief valve apparatus, as claimed in claim 1, wherein said valve is adapted for use with a pneumatic tire mounted on a wheel rim and wherein:

said inlet is provided with a threaded portion for threadedly securing said valve to a rim.

8. Fluid pressure relief valve apparatus, as claimed in claim 1, wherein:

said casing is provided with an annular recess and a retaining ring removably secured therein;

said deformable support means being urged into engagement with said retaining ring under the influence of said resilient means.

9. Fluid pressure relief valve apparatus as claimed in claim 1 wherein:

said inlet is provided with an annular seat;

said fluid pressure responsive means is provided with a resilient seal portion adapted to engage said valve seat to provide a fluid seal.

* * * * *